United States Patent [19]
Rasky et al.

[11] Patent Number: 5,265,122
[45] Date of Patent: Nov. 23, 1993

[54] METHOD AND APPARATUS FOR ESTIMATING SIGNAL WEIGHTING PARAMETERS IN A DIVERSITY RECEIVER

[75] Inventors: Philip D. Rasky, Buffalo Grove; Gregory M. Chiasson, Schaumburg, both of Ill.

[73] Assignee: Motorola, Inc., Schaumburg, Ill.

[21] Appl. No.: 854,511

[22] Filed: Mar. 19, 1992

[51] Int. Cl.⁵ .................. H04B 7/10; H04B 17/02; H04B 7/00
[52] U.S. Cl. .................. 375/100; 455/137; 455/139; 455/273; 455/276.1
[58] Field of Search .......... 375/14, 100, 103, 15, 375/16; 455/139, 137, 273, 276.1

[56] References Cited

U.S. PATENT DOCUMENTS

| | | | |
|---|---|---|---|
| 3,633,107 | 1/1972 | Brady | 455/137 |
| 3,879,664 | 4/1975 | Monsen | 375/14 |
| 4,083,009 | 4/1978 | Bickford et al. | 375/100 |
| 4,112,370 | 9/1978 | Monsen | 375/100 |
| 4,186,347 | 1/1980 | Brockman et al. | 375/100 |
| 4,210,871 | 7/1980 | Hill et al. | 455/137 |
| 4,271,525 | 6/1981 | Watanabe . | |
| 4,281,411 | 7/1981 | Bonn et al. | 455/137 |
| 4,328,585 | 5/1982 | Monsen . | |
| 4,752,941 | 6/1988 | Takahaya et al. | 455/139 |
| 4,761,796 | 8/1988 | Dunn et al. . | |
| 5,031,193 | 7/1991 | Atkinson et al. . | |

Primary Examiner—Curtis Kuntz
Assistant Examiner—Vijay Shankar
Attorney, Agent, or Firm—Richard A. Sonnentag

[57] ABSTRACT

A diversity receiver (300) has improved diversity weighting parameter estimation. The receiver receives different versions of a signal (101) having encoded data, combines the versions and decodes the data contained within the combination. The decoded data output is then re-encoded using a similar technique as that at a transmitter which transmitted the signal (101). The re-encoded data is then used to calculate a diversity weighting parameter which is used to modify a stored replica each version. The modified versions are then combined and decoded to yield a more accurate estimate of the information contained within the signal (101) at diversity receiver (300).

34 Claims, 4 Drawing Sheets

METHOD AND APPARATUS FOR ESTIMATING SIGNAL WEIGHTING PARAMETERS IN A DIVERSITY RECEIVER

RELATED INVENTION

Reference is made to U.S. patent application Ser. No. 07/854,506, "Method and Apparatus for Estimating Signal Weighting Parameters in a Receiver" in behalf of Chiasson et al., filed on the same date herewith, containing related subject matter and assigned to the assignee of the present invention.

FIELD OF THE INVENTION

This invention relates generally to estimation of signal parameters in a receiver and more specifically to the estimation of signal parameters in a receiver for use in diversity combining.

BACKGROUND OF THE INVENTION

Diversity combining is widely used within digital communications due to the performance gains which result from combining two or more separately faded receiver branches. In order to realize the entire available gain, the diversity branches must be accurately weighted and combined. To accomplish this, accurate information about a channel, or a signal transmitted, must be available to the diversity receiver. However, since the structure of the channel is typically unknown, the channel parameters required to realize the entire available gain must be estimated by the receiver.

For an M-branch diversity receiver for an arbitrary binary communication channel with time-varying channel gain and noise variance, the channel can be modeled as:

$$r_m = p_m x_s + n_m, \quad m \in 1 \ldots M$$

where $r_m$ is the received signal vector, $p_m$ is the channel gain (diagonal) matrix, $x_s$ is the transmitted signal vector, $n_m$ is the noise vector, and m denotes the diversity branch. The most general linear combiner can be modeled as $$r = \sum_{m=1}^{M} a_m r_m$$

where $a_m$ denotes the diversity weighting coefficient or parameter for branch m.

It can be shown that by defining an error signal $e_{sm}(k) = r_m(k) - x_s(k)$, the individual components of $a_m(k)$ may be calculated as $$p_m(k) = \frac{\sigma_{rm}^2(k) - \sigma_{em}^2(k) + c}{2c}$$

and $$\sigma_{nm}^2(k) = \sigma_{rm}^2(k) - c p_m^2(k)$$

As indicated by these equations, the validity of these estimates is directly related to the accuracy of $\sigma_{rm}^2(k)$ and $\sigma_{em}^2(k)$. While $\sigma_{rm}^2(k)$ is simply related to the received signal power, $\sigma_{em}^2(k)$ is not as easy to obtain since, at the receiver, the transmitted sequence $x_s(k)$ is not available. Current techniques attempt to circumvent this problem by assuming that for a specific symbol k in the received sequence of the signal, the error signal is the difference between the received signal and the closest constellation point (CCP). While this technique is adequate if the CCP corresponds to the transmitted signal, in cases where it does not (i.e., the channel has caused an error), the estimate of $\sigma_{em}^2(k)$ can be highly inaccurate and hence $a_m(k)$ can be highly inaccurate.

Thus, a need exists for a new method and apparatus for estimating the diversity weighting coefficient $a_m(k)$ which provides a significant increase in accuracy by fully utilizing the information available at the diversity receiver.

SUMMARY OF THE INVENTION

A communication system has a diversity receiver, the diversity receiver having at least first and second branches for receiving at least first and second versions of a signal. The diversity receiver generates, within each of the first and second branches, at least a first diversity weighting parameter related to the at least first and second versions and modifies each of the first and second versions with the corresponding at least a first diversity weighting parameter generated within each of the first and second branches. The diversity receiver then combines the modified first and second versions to produce a first combined signal, corrects the first combined signal to produce at least a first corrected signal, and generates, within each of the first and second branches, at least a second diversity weighting parameter related to the signal utilizing each of the corresponding first and second corrected signals.

DETAILED DESCRIPTION OF A PREFERRED EMBODIMENT

Figure 1:
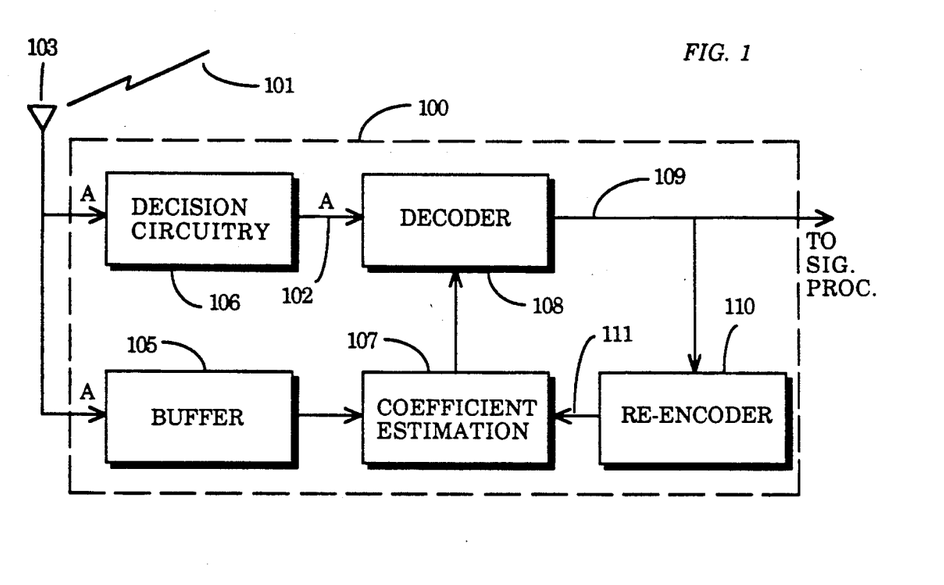
FIG. 1 generally depicts, in block diagram form, a single branch receiver which implements parameter estimation.

FIG. 1 generally depicts, in block diagram form, a single branch receiver which implements parameter estimation. Discussion of FIG. 1 is intended to provide a background of how parameter estimation in a single branch receiver is performed. Links denoted by A in FIG. 1 are used only in the initial iteration. The receiver 100 receives a signal 101 transmitted by a transmitter (not shown). Signal 101 is an encoded signal, where in the preferred embodiment, the encoding includes an interleaving process. Signal 101 is received by an antenna 103 and input into decision circuitry 106. Decision circuitry 106 transforms the received signal into a received encoded vector 102 which represents signal 101 in vector form. Decision circuitry 106 is comprised of all necessary demodulation hardware and also performs hard-decision making or soft-decision making.

Figure 2:
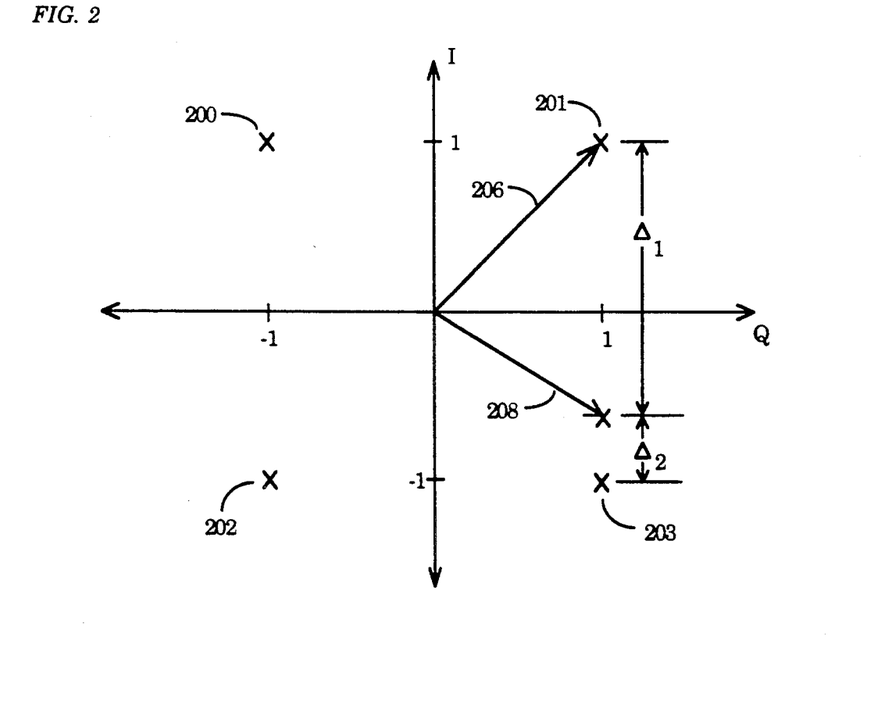
FIG. 2 generally depicts an I-Q constellation which may be used to represent a signal after demodulation.

FIG. 2 generally depicts an I-Q constellation which may be used to represent signal 101 after demodulation. In the preferred embodiment, the constellation depicted in FIG. 2 is for a quaternary phase-shift keying (QPSK) or quaternary amplitude modulation (QAM) modulated signal 101. However, alternate embodiments may employ other types of modulation such as, inter alia, BPSK, 8PSK, 16QAM. As depicted in FIG. 2, the I-Q constellation is comprised of four constellation points 200–203 which represent the four possible hard-decisions which may be output by decision circuitry 106 if hard-decision making is employed. Also depicted in FIG. 2 is the transmitted signal 101 depicted in vector form by vector 206. Vector 206 represents the ideal transmission and the transmission that receiver 100 would receive in ideal situations. However, due to errors introduced by the corresponding channel, a typical vector r received by receiver 100 is vector 208. Vector 208 represents what receiver 100 received, and thus what it thinks is correct. Obviously, if vector 206 represents the signal transmitted, and vector 208 represents what the receiver 100 received (i.e., thinks was transmitted), considerable error is introduced by both the propagation medium and receiver 100.

Recall that an M-branch diversity receiver for an arbitrary binary communication channel with time-varying channel gain and noise variance can be modeled as:

$$r_m = p_m x_s + n_m, \quad m \in 1 \ldots M \quad (1)$$

where $r_m$ is the received signal vector, $p_m$ is the channel gain (diagonal) matrix, $x_s$ is the transmitted signal vector, $n_m$ is the noise vector, and m denotes the diversity branch. The most general linear combiner can be modeled as $$r = \sum_{m=1}^{M} a_m r_m \quad (2)$$

where $a_m$ denotes the diversity weighting coefficient for branch m. First, consider the max-ratio combiner—one which seeks to maximize the signal to noise ratio of the combined signal. Assuming that each element, or symbol k, of $x_s$, denoted by $x_s(k)$, is an independent identically distributed (i.i.d.) binary random variable taking values $\pm\sqrt{c}$ with equal probability, where c is a constant, and that each element of the noise vector $n_m$ is an independent Gaussian random variable with zero mean and variance $\sigma_{nm}^2(k)$, it can be shown that the optimal weighting coefficient for this receiver is $$a_m(k) = \frac{p_m(k)}{\sigma_{nm}^2(k)} \quad (3)$$

In alternate embodiments, other methods for combining the channel gain, $p_m(k)$, and noise variance, $\sigma_{nm}^2(k)$, to from diversity weighting parameter $a_m(k)$ may be employed. Likewise, parameters other than channel gain $p_m(k)$ and noise variance $\sigma_{nm}^2(k)$ may be utilized to calculate diversity weighting parameter $a_m(k)$.

While the max-ratio combiner seeks to output a signal formed from a weighted summation of the input branches, the selection combiner seeks only to output the optimal branch. In this case, all of the coefficients are zero except for that of the chosen branch. Recalling that with the above assumptions, the single-branch maximum likelihood decoder seeks the value of s which maximizes $$\sum_k \frac{p_d(k)}{\sigma_n^2(k)} r(k) x_s(k) \quad (4)$$

it is apparent that selection combining can be performed by selecting the branch with the largest $a_m(k)r(k)$. For a detailed discussion of selection combining, reference is made to M. Schwartz, W. R. Bennett, and S. Stein, *Communication Systems and Techniques*, New York, McGraw-Hill, 1966 at pages 432–442. Thus, with both combining techniques, the diversity weighting coefficients can be calculated in the same manner.

Again, it can be shown that by defining an error signal $e_{sm}(k) = r_m(k) - x_s(k)$, the individual components of $a_m(k)$ may be calculated as $$p_m(k) = \frac{\sigma_{rm}^2(k) - \sigma_{em}^2(k) + c}{2c} \quad (5)$$

$$\sigma_{nm}^2(k) = \sigma_{rm}^2(k) - c p_m^2(k) \quad (6)$$

The calculation of the expectations is taken over a number of bits for which the channel gain and noise variance parameters don't vary appreciably. In the preferred embodiment, the communication system is a slow-frequency hopping (SFH) code-division multiple access (CDMA) communication system where the number of bits for which the channel gain and noise variance parameters don't vary appreciably is the period of a single frequency hop. For a background on frequency hopping in communication systems, reference is made to George Calhoun, *Digital Cellular Radio*, U.S.A., 1988 at pages 344–351. Continuing, in alternate embodiments, the communication system may be, inter alia, a continuous data communication system or a time-division multiple access (TDMA) communication system. Specifically for TDMA communication systems, the number of bits for which the channel gain and noise variance parameters don't vary appreciably may be the entire period of a timeslot for short timeslot systems. One such system is the Groupe Special Mobile (GSM) Pan-European Digital Cellular System. For other TDMA systems having longer timeslots, for example the United States Digital Cellular (USDC) System, a "windowing" technique may be employed to minimize parameter variation during the period of the expectation as required. Several common windowing techniques include rectangular windowing and exponential decay windowing.

Recall that the error signal is given by $e_s(k)$, and the ideal transmitted signal $x_s(k)$ is given by vector 206 of FIG. 2. If the channel is severely corrupted, the received signal r(k) could be the vector 208. Typically, receivers assume that for a given symbol k in a data sequence, the error signal is the difference between the received signal and the closest constellation point (CCP). Thus, referring to FIG. 2, if the received signal r(k) is vector 208, a typical receiver's estimation of the error signal would be $\Delta_2$, since it is closest to constellation point 203. However, the constellation point which should be used, as it corresponds to the ideal transmitted vector 206, is constellation point 201. This being the case, the actual error in the receiver is $\Delta_1$ and not $\Delta_2$. This type of discrepancy, between the error the receiver thinks it sees and what it should see, is what the present invention seeks to improve.

Now referring back to FIG. 1, the output from decision circuitry 106 is a received encoded vector 102 which may be weighted (for example by CCP soft-decision making) or may not be weighted (hard-decision making). Received encoded vector 102 is input into a decoder 108, which in the preferred embodiment includes de-interleaving and Viterbi decoding. In alternate embodiments, many types of error correction codes, and consequently decoders, may be incorporated. Referring back to FIG. 2, the error in the receiver, assuming vector 206 is what was actually transmitted and vector 208 represents what receiver 100 thinks was transmitted, is represented by $\Delta_2$. If this error signal were used to calculate the variance of the error signal for later use in calculating the diversity weighting parameter $\alpha(k)$, the weighting of signal 101 in receiver 100 would be grossly inaccurate. Referring back to FIG. 1, output from decoder 108 is a decoded received vector 109 which, by virtue of the error correction coding in decoder 108, has fewer errors than does received encoded vector 102. Decoded received vector 109, which after the initial iteration is a first decoded received vector, is then re-encoded in accordance with the invention. In the preferred embodiment, the re-encoder 110 re-encodes the first decoded received vector in a manner using the same technique as that used by the transmitter (not shown).

Output from re-encoder 110 is modified received vector 111, which, after this first iteration, is a first modified received vector. Modified received vector 111 is a better estimate of signal 101 than is received encoded vector 102. Modified received vector 111 enters coefficient estimation block 107 where a diversity weighting parameter $\alpha(k)$ is calculated using modified received vector 111. Since, at this point, modified received vector 111 contains information about signal 101, receiver 100 can determine whether the CCP technique used initially was correct or not. In the example presented in FIG. 2, receiver 100 will determine that the CCP technique used was incorrect. Receiver 100 corrects for this by now using constellation point 201 for calculation of diversity weighting parameter $\alpha(k)$, thus giving a more accurate estimate of transmitted signal $x_s(k)$ represented by vector 206. In the preferred embodiment, diversity weighting parameter $\alpha(k)$ is a soft-decision weighting parameter, which will be used to further weight or modify a stored replica of signal 101. At this time, the newly calculated diversity weighting parameter represents a second diversity weighting parameter. Calculation of the second diversity weighting parameter is performed in coefficient estimation block 107 using modified received vector 111 where it is used to modify a stored replica of signal 101 retrieved from buffer 105. The modified stored replica is then decoded, resulting at this point in a second decoded received vector. By virtue of the first iteration through re-encoder 110 and coefficient estimation block 107, the second decoded received vector has fewer errors than did first decoded received vector 109 since the first iteration allowed receiver 100 to learn information about signal 101, and more specifically about the data contained within signal 101. By iterating in this manner, receiver 100 is able to make a better estimate of what signal 101 looked like, and can thus more accurately reconstruct signal 101 at receiver 100.

A first iteration through the re-encoder 110 and into coefficient estimation block 107 will obviously help receiver 100 learn more about signal 101. However, although it may be adequate, receiver 100 is not limited to only a single iteration. In fact, each time receiver 100 undergoes an iteration, it corrects more and more of the errors introduced by both the propagation medium and receiver 100 with respect to signal 101. At some number of iterations, however, the amount of errors that decoder 108 is able to correct will decrease and will eventually reach a point of diminishing return since receiver 100 will reach a point where there are no longer any errors possible for receiver 100 to correct with respect to signal 101. The number of iterations that receiver 100 undergoes is dependent upon the performance requirements of receiver 100.

In an alternate embodiment, receiver 100 could have a limited amount of knowledge about signal 101, specifically about data contained within signal 101. For example, signal 101 could be a burst signal within a time-division multiple access (TDMA) communication system which has a fully-known amount of information. This information may be, but is not limited to, continuous sequences such as a preamble, midamble, or a postamble. In this scenario, receiver 100 would use the fully-known amount of information as the estimate of $x_s$ in the determination of the error signal and, consequently, improve the accuracy of the diversity weighting parameter. The receiver 100 would use the fully-known amount of information in place of the corresponding $x_s(k)$ sequence for these bits. This would result in the generation of completely accurate diversity weighting parameters over the span of these bits. This information could be combined with diversity weighting parameters derived from the unknown data bits using the previously discussed CCP techniques to form a diversity weighting parameter which would be used to scale signal 101 in the first decoding iteration. In latter iterations, the diversity weighting parameter from the known data bits could be combined with weighting parameters derived from the unknown data bits using the previously discussed re-encoding technique.

In another embodiment, signal 101 could be a signal which has a partially-known amount of information, for example, inter alia, a digital voice color code (DVCC) sequence. In this scenario, the diversity weighting parameter may not be as accurate since the receiver does not explicitly know the corresponding $x_s(k)$ sequence; it simply knows that these symbols belong to a particular subset. Consequently, the diversity weighting parameters would be calculated via a modified technique in which the error signal, and hence the diversity weighting parameter, would be calculated in the previously described manner for the unknown data bits while for the partially known bits the error term and hence the diversity weighting parameter would be calculated using only the constellation points within the set of allowable values. These two weighting parameters would then be combined to form a diversity weighting parameter which would be used to scale signal 101.

Figure 3:
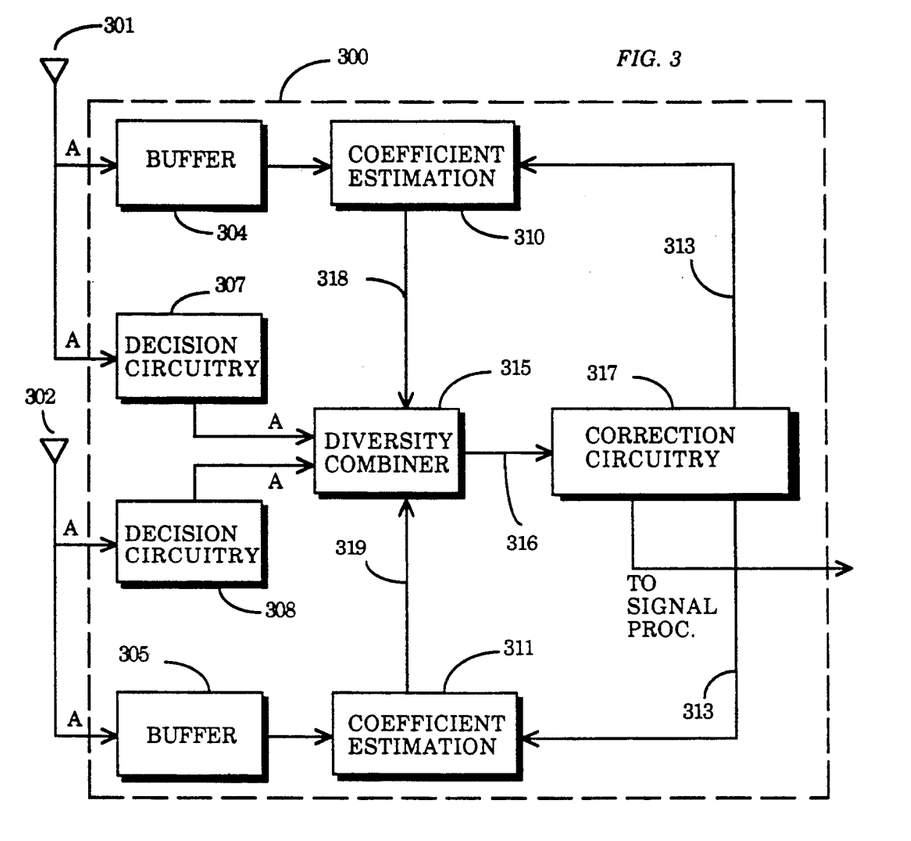
FIG. 3 generally depicts a diversity receiver which implements improved parameter estimation in accordance with the invention.

FIG. 3 generally depicts implementation of diversity weighting parameter estimation in a diversity receiver 300 in accordance with the invention. As depicted, diversity receiver 300 is comprised of similar components as depicted in FIG. 1. For example, buffers 304, 305 are similar to buffer 105, decision circuitry 307, 308 is similar to decision circuitry 106, and antennas 301, 302 are similar to antenna 103. Likewise, operation of these similar components is similar. A signal, for example a signal such as signal 101 of FIG. 1 (not shown in FIG. 3) will have propagated through some environment to get to antennas 301, 302. At that point, antennas 301, 302 would not receive a common version of signal 101, but would receive different versions of signal 101. The corresponding versions would enter decision circuitry 307, 308 each of which would generate at least a first diversity weighting parameter related to at least the first and second versions. Decision circuitry 307, 308 would then modify each of the first and second signal versions with the corresponding first diversity weighting parameters generated within each branch of diversity receiver 300. Output from decision circuitry 307, 308 would enter diversity combiner 315 where those outputs would be combined to produce a first combined signal 316. In the preferred embodiment, diversity combiner 315 is a maximum ratio diversity combiner. In alternate embodiments, diversity combiner 315 may be a selection diversity combiner. Continuing, first combined signal 316 enters correction circuitry 317 which has as an output at least a first corrected signal 313 and also an output line which is coupled to further signal processing means. First corrected signal 313 enters coefficient estimation blocks 310, 311 as does a stored replica of the first and second versions of signal 101. In the preferred embodiment, signal 101 is encoded with forward error correction encoding at the transmitter from which it has been launched.

Figure 4:
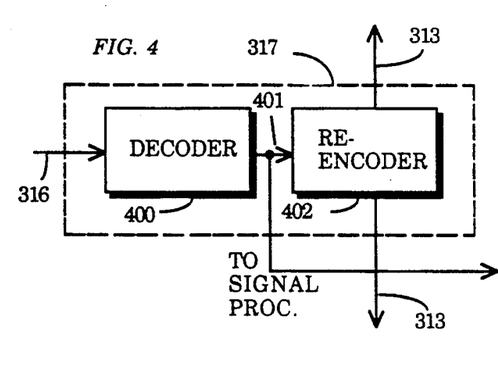
FIG. 4 depicts the preferred embodiment of correction circuitry depicted in FIG. 3.

Coefficient estimation blocks 310, 311 modify the first and second versions of the encoded signal with a second generated diversity weighting parameter which has been generated within each of the first and second branches. Outputs from coefficient estimation blocks 310, 311 are first and second re-weighted versions of the encoded signal which are then combined in diversity combiner 315 to produce a second combined signal. At this point, the second combined signal represents a signal similar to first combined signal 316, but has a more accurate weighting due to the signal iteration through the loop consisting of correction circuitry 317 and coefficient estimation blocks 310, 311. At this point, the second combined signal can be further manipulated by correction circuitry 317 to eventually yield an output to signal processing. When signal processing is employed, diversity receiver 300 uses that signal to reconstruct signal 101 in receiver 300. FIG. 4 depicts the preferred embodiment of correction circuitry 317 depicted in FIG. 3. As illustrated, combined signal 316 enters a decoder 400, which in the preferred embodiment is a Viterbi decoder. Output from the Viterbi decoder 400 is a decoded signal 401. Decoded signal 401 then enters a re-encoder 402 which re-encodes decoded signal 401 with a similar forward error correction (FEC) code as done at the transmitter. Re-encoder 402 has as an output at least a first corrected signal 313. In the preferred embodiment, corrected signal 313 is input to both coefficient estimation blocks 310, 311; in alternate embodiments these inputs may differ.

Figure 5:
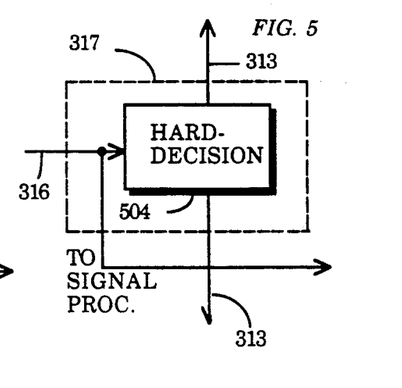
FIG. 5 depicts an alternate embodiment of correction circuitry depicted in FIG. 3.

While the previously discussed technique can improve the performance of diversity combining in systems employing FEC, in some cases it is not necessary to make this restriction. Thus, FIG. 5 depicts an alternate embodiment of correction circuitry 317 which does not require decoder 400. As depicted in FIG. 5, only hard-decision block 504 need be employed. As in the preferred embodiment of FIG. 4, diversity receiver 300 initially calculates the weighting coefficient for each branch using the CCP coefficient estimation technique. However, due to the fact that after combining in diversity combiner 315, combined signal 316 will have fewer errors than if generated by a single branch, a hard decision made on combined signal 316 will yield information which can be used to calculate an even more accurate set of diversity weighting coefficients when used in multiple iterations. While the performance gain which results from this method is considerably smaller than that available from the systems employing coding, this technique involves significantly less overhead and complexity than does the technique of coded systems. Consequently, depending on the system requirements, the non-decoded implementation as depicted in FIG. 5 may be a viable design option.

Figure 6:
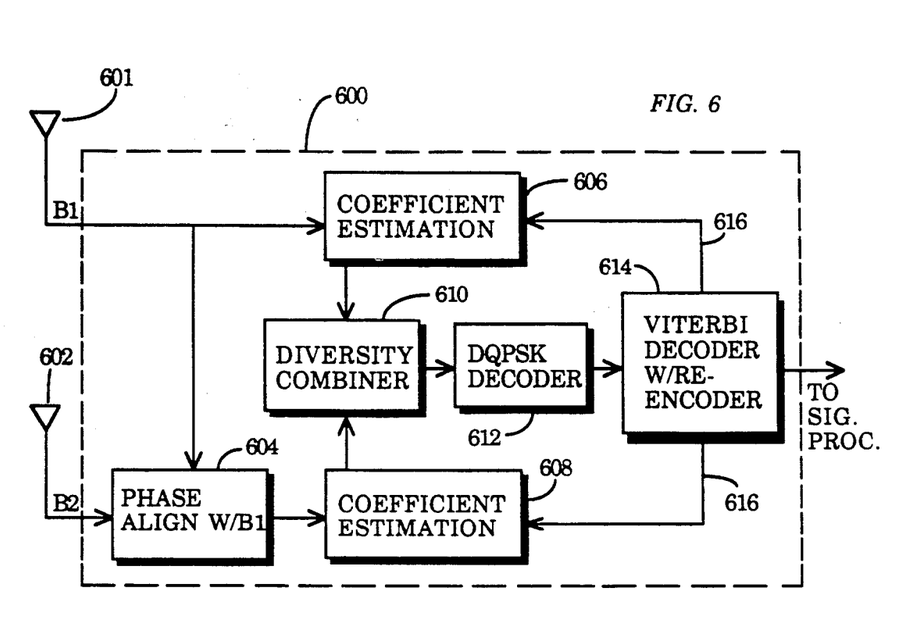
FIG. 6 generally illustrates one embodiment of improved parameter estimation implemented in a communication system in accordance with the invention.
Figure 7:
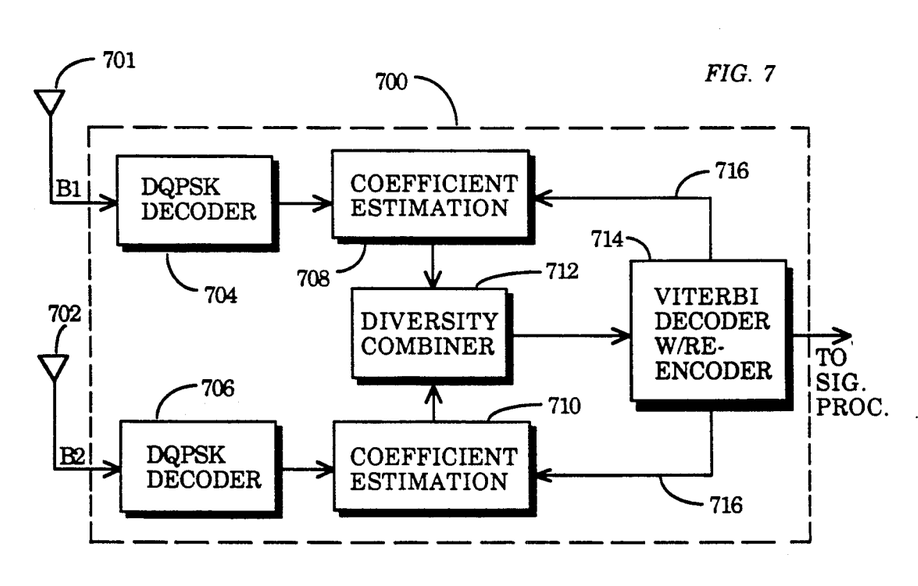
FIG. 7 generally illustrates another embodiment of improved parameter estimation implemented in a communication system in accordance with the invention.

Thus far, the techniques for improving the estimation of diversity weighting coefficients have been presented at a generic level—in accordance with their broad-based utility. However, the generic receiver can be implemented in a variety of practical systems. As previously stated, the preferred embodiment is a SFH CDMA communication system. FIG. 6 and FIG. 7 generally illustrate embodiments of improved parameter estimation in a SFH CDMA communication system in accordance with the invention.

Referring to FIG. 6, SFH diversity receiver 600 employs antennas 601, 602 to receive different versions of transmitted signal (not shown). Phase align block 604 aligns the branch having antenna 602 (branch 2, B2) with the branch having antenna 601 (branch 1, B1). The phase aligned received versions are input into coefficient estimation blocks 606, 608 where a first diversity weighting parameter for each branch B1, B2 is calculated and used to modify the received versions. Outputs from coefficient estimation blocks 606, 608 are input into diversity combiner 610 where the two modified versions are combined. Output from diversity combiner 610 is input into differential quaternary phase-shift keyed (DQPSK) decoder 612 which essentially performs demodulation of the output of diversity combiner 610. Output from DQPSK decoder 612 is input into block 614, which in the preferred embodiment is a combination Viterbi decoder and re-encoder. The re-encoding is a similar technique as that done at the transmitter (not shown) from which the signal has been launched. Block 614 decodes the output from DQPSK decoder 612 and outputs at least a first corrected signal 616. In the preferred embodiment, versions 616 going to each branch (B1, B2) are the same signals. At this point, signal 616 in each branch is used to generate a second diversity weighting parameter which is used to modify the received signal in each branch (B1, B2). The iterations through blocks 606, 608, 610, 612, and 614 may be repeated until it is no longer possible to correct any errors that were in the received versions.

The SFH diversity receiver 700 depicted in FIG. 7 is similar in operation as diversity receiver 600 of FIG. 6. Antennas 701 and 702 receive different versions of a transmitted signal (not shown). The received versions enter DQPSK decoders (704, 706), which is similar to DQPSK decoder 612 of FIG. 6. DQPSK decoders 704 and 706 essentially perform demodulation on each received version of the signal. Outputs from DQPSK decoders 704 and 706 are input into coefficient estimation blocks 708 and 710 where a first diversity weighting parameter for each branch B1, B2 is calculated and used to modify the received versions. Output from coefficient estimation blocks 708 and 710 are input into diversity combiner 712 where the two modified versions are combined. The combined output is input into block 714, which again, in the preferred embodiment, is a combination Viterbi decoder and re-encoder. The re-encoding is a similar technique as that done at the transmitter from which the signal has been launched. As in receiver 600, the iterations through blocks 708, 710, 712, and 714 may be repeated until it is no longer possible to correct any errors that were in the received versions.

Figure 8:
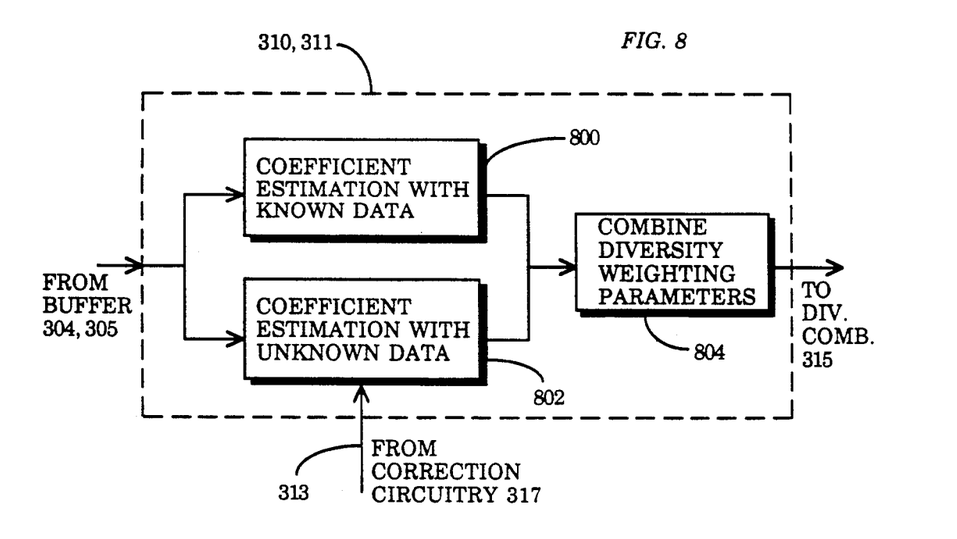
FIG. 8 generally depicts an alternate embodiment of coefficient estimation circuitry which employs fully-known or partially-known data and unknown data for improved diversity weighting parameter estimation in accordance with the invention.

As previously described, single branch receiver 100 could have a limited amount of information about signal 101, specifically about data contained within signal 101. FIG. 8 generally depicts an alternate embodiment of coefficient estimation circuitry 310 and 311 which employs fully-known or partially-known data in combination with unknown data in diversity receiver 300. The operation of diversity receiver 300 would be similar to that described in FIG. 3, but would be differ as follows. The stored replica of the different versions of signal 101 would enter coefficient estimation blocks 310, 311 where the stored versions would enter blocks 800 and 802. Block 800 is where coefficient estimation with known data would occur while block 802 is where coefficient estimation with unknown data occurs. As depicted in FIG. 8, block 802 does not require an input from correction circuitry 317 since the data in block 800 is known and obtaining an accurate estimation of that data is not a problem. However, since receiver 300 does not know about the unknown data, block 802 has as input corrected signal 313 from correction circuitry 317 which is used to gain a better estimate of the unknown data. Outputs from blocks 800 and 802 are combined in block 804, whose output is then sent to diversity combiner 315 where diversity combining occurs as previously described.

Thus, it will be apparent to one skilled in the art that there has been provided in accordance with the invention, a method and apparatus for estimating signal weighting parameters in a receiver that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What we claim is:

1. In a communication system having a diversity receiver, the diversity receiver having at least first and second branches for receiving at least first and second versions of a signal, a method of estimating diversity weighting parameters in the diversity receiver, the method comprising the steps of:

generating, within each of the first and second branches, at least a first diversity weighting parameter related to said at least first and second versions;

modifying each of the first and second versions with the corresponding at least a first diversity weighting parameter generated within each of the first and second branches;

combining said modified first and second versions to produce a first combined signal;

correcting said first combined signal to produce at least a first corrected signal; and generating, within each of the first and second branches, at least a second diversity weighting parameter related to the signal utilizing said at least a first corrected signal.

2. The method of claim 1 wherein said signal further comprises an encoded signal.

3. The method of claim 2 wherein said step of correcting further comprises the steps of:

decoding said first combined signal to produce a first decoded signal; and re-encoding said first decoded signal to produce said at least the first corrected signal.

4. The method of claim 3 further comprising the steps of:

modifying said first and second versions of the encoded signal with said at least a second diversity weighting parameter generated within each of the first and second branches to produce first and second re-weighted versions of the encoded signal;

combining said first and second re-weighted versions of the encoded signal to produce a second combined signal; and decoding said second combined signal to produce a second decoded signal.

5. The method of claim 4 wherein said step of modifying said first and second versions of the encoded signal further comprises the step of modifying stored replicas of said first and second versions of the encoded signal.

6. The method of claim 3 wherein said second decoded signal is utilized to reconstruct the encoded signal in the receiver.

7. The method of claim 1 wherein said step of correcting further comprises the step of making a hard-decision on said first combined signal to produce said at least the first corrected signal.

8. The method of claim 6 further comprising the steps of:

modifying said first and second versions of the signal with said at least a second diversity weighting parameter generated within each of the first and second branches to produce first and second re-weighted versions of the signal; and combining said first and second re-weighted versions of the signal to produce a second combined signal.

9. The method of claim 8 wherein said second combined signal is utilized to reconstruct the signal in the receiver.

10. In a communication system having a transmitter and a diversity receiver, the transmitter transmitting an encoded signal received by the diversity receiver, a method of estimating a plurality of diversity weighting parameters, the method comprising the steps of:

receiving a first and a second version of the encoded signal at a first and a second branch of the diversity receiver, respectively;

generating, within each of the first and second branches, a first diversity weighting parameter related to said respective first or second versions of the encoded signal;

modifying each of the first and second versions of the encoded signal with the corresponding first diversity weighting parameter;

combining said modified first and second versions of the encoded signal to produce a first combined signal;

decoding said first combined signal to produce a first decoded signal;

re-encoding said first decoded signal; and generating, within each of the first and second branches, at least a second diversity weighting parameter related to the encoded signal utilizing said re-encoded signal.

11. The method of claim 10 wherein said step of re-encoding is a reciprocal technique to that used by the transmitter.

12. The method of claim 10 further comprising the steps of:

modifying said first and second versions of the encoded signal of the encoded signal with said at least second generated diversity weighting parameter generated within each of the first and second branches to produce first and second re-weighted versions of the encoded signal;

combining said first and second re-weighted versions of the encoded signal to produce a second combined signal; and decoding said second combined signal to produce a second decoded signal.

13. The method of claim 12 wherein said step of modifying said first and second versions of the encoded signal further comprises the step of modifying a stored replica of each of said first and second versions of the encoded signal.

14. The method of claim 10 wherein said second decoded signal is utilized to reconstruct the encoded signal in the receiver.

15. The method of claim 10 wherein said diversity weighting parameters further comprise soft-decision weighting parameters.

16. The method of claim 10 wherein said step of decoding further comprises the step of one of either hard-decision decoding and soft-decision decoding.

17. The method of claim 10 wherein said step of decoding is performed by a Viterbi decoder.

18. In a communication system employing a diversity receiver, the diversity receiver having at least first and second branches for receiving a first and a second version of a signal, a method of estimating diversity weighting parameters in the diversity receiver, the method comprising the steps of:

aligning a phase of said received first and second versions;

generating, within each of the first and second branches, a first diversity weighting parameter related to said first and second versions, respectively;

modifying each of the first and second versions with the corresponding at least a first diversity weighting parameter generated within each of the first and second branches;

combining said modified first and second versions to produce at least a first combined signal;

demodulating said first combined signal to produce a first demodulated signal;

correcting said first demodulated signal to produce at least a first corrected signal; and generating, within each of the first and second branches, at least a second diversity weighting parameter related to the signal utilizing said at least a first corrected signal.

19. The method of claim 18 wherein said signal further comprises an encoded signal.

20. The method of claim 19 wherein said step of correcting further comprises the steps of:

Viterbi decoding said first demodulated signal to produce a first decoded signal; and re-encoding said first decoded signal to produce said at least a first corrected signal.

21. The method of claim 20 wherein said first decoded signal is utilized to reconstruct the encoded signal in the receiver.

22. In a communication system employing a diversity receiver, the diversity receiver having at least first and second branches for receiving at least first and second versions of a signal, a method of estimating diversity weighting parameters in the diversity receiver, the method comprising the steps of:

demodulating said at least first and second versions of the signal to produce first and second demodulated versions of the signal;

generating, within each of the first and second branches, at least a first diversity weighting parameter related to said at least first and second versions;

modifying each of said first and second demodulated versions with the corresponding at least a first diversity weighting parameter generated within each of the first and second branches;

combining said modified first and second versions to produce a first combined signal;

correcting said first combined signal to produce at least a first corrected signal; and generating, within each of the first and second branches, at least a second diversity weighting parameter related to the signal utilizing said at least a first corrected signal.

23. The method of claim 22 wherein said signal further comprises an encoded signal.

24. The method of claim 23 wherein said step of correcting further comprises the steps of:

Viterbi decoding said first combined signal to produce a first decoded signal; and re-encoding said first decoded signal to produce said at least a first corrected signal.

25. The method of claim 24 wherein said first decoded signal is utilized to reconstruct the encoded signal in the receiver.

26. A diversity receiver employed in a communication system, the diversity receiver having at least first and second branches for receiving at least first and second versions of a signal, the diversity receiver estimating weighting parameters of the signal, the diversity receiver comprising:

means, within each of the first and second branches, for generating at least a first diversity weighting parameter related to said at least first and second versions;

means for modifying each of the first and second versions with the corresponding at least a first diversity weighting parameter generated within each of the first and second branches;

means for combining said modified first and second versions to produce a first combined signal;

means for correcting said first combined signal to produce at least a first corrected signal; and means for generating, within each of the first and second branches, at least a second diversity weighting parameter related to the signal utilizing said at least a first corrected signal.

27. The diversity receiver of claim 26 wherein said signal further comprises an encoded signal.

28. The diversity receiver of claim 27 wherein said means for correcting further comprises:
  means for decoding said first combined signal to produce a first decoded signal; and
  means for re-encoding said first decoded signal to produce said at least a first corrected signal.

29. A diversity receiver employed in a frequency hopping communication system, the diversity receiver having at least first and second branches for receiving at least first and second frequency-hopped versions of a signal, the diversity receiver estimating weighting parameters of the signal, the diversity receiver comprising:
  means, within each of the first and second branches, for generating at least a first diversity weighting parameter related to said at least first and second frequency-hopped versions;
  means for modifying each of the first and second versions with the corresponding at least a first diversity weighting parameter generated within each of the first and second branches;
  means for combining said modified first and second versions to produce a first combined signal;
  means for correcting said first combined signal to produce at least a first corrected signal; and
  means for generating, within each of the first and second branches, at least a second diversity weighting parameter related to the signal utilizing said at least a first corrected signal.

30. The diversity receiver of claim 29 wherein said diversity receiver employed in a frequency hopping communication system is employed in one of either a slow-frequency hopping communication system or a fast-frequency hopping communication system.

31. The diversity receiver of claim 29 wherein said diversity receiver is employed in a code-division multiple access (CDMA) communication system.

32. A diversity receiver employed in a time-division multiple access (TDMA) communication system, the diversity receiver having at least first and second branches for receiving at least first and second versions of a signal within a first and second TDMA timeslot, the diversity receiver estimating weighting parameters of the signal, the diversity receiver comprising:
  means, within each of the first and second branches, for generating at least a first diversity weighting parameter related to said at least first and second versions;
  means for modifying each of the first and second versions with the corresponding at least a first diversity weighting parameter generated within each of the first and second branches;
  means for combining said modified first and second versions to produce a first combined signal;
  means for correcting said first combined signal to produce at least a first corrected signal; and
  means for generating, within each of the first and second branches, at least a second diversity weighting parameter related to the signal utilizing said at least a first corrected signal.

33. In a communication system having a transmitter and a diversity receiver, the transmitter transmitting a signal having data contained therein, the receiver having a limited amount of information about the data, a method of estimating diversity weighting parameters in the diversity receiver, the method comprising the steps of:
  receiving first and second versions of the signal within a first and second branch of the diversity receiver;
  generating a diversity weighting parameter, related to the signal, within each of said first and second branches;
  modifying the received signal with said generated diversity weighting parameter related to said first and second versions;
  combining said modified first and second versions to produce a first combined signal;
  correcting said first combined signal to produce at least a first corrected signal; and
  generating, within each of the first and second branches, at least a second diversity weighting parameter related to the signal utilizing said at least a first corrected signal.

34. The method of claim 33 wherein said second diversity weighting parameter may be generated by a combination of a fully-known amount of data or a partially-known amount of data and a remainder of unknown bits.

* * * * *

UNITED STATES PATENT AND TRADEMARK OFFICE
CERTIFICATE OF CORRECTION

PATENT NO. : 5,265,122

DATED : November 23, 1993

INVENTOR(S) : Rasky et al.

It is certified that error appears in the above-identified patent and that said Letters Patent is hereby corrected as shown below:

Col. 11, line 52, after "branches," please insert --at least--.

Signed and Sealed this

Seventh Day of June, 1994

BRUCE LEHMAN

*Attest:*

*Attesting Officer*     *Commissioner of Patents and Trademarks*